(No Model.)
W. L. RAMSEY.
LATHE TOOL REST.
No. 416,644. Patented Dec. 3, 1889.
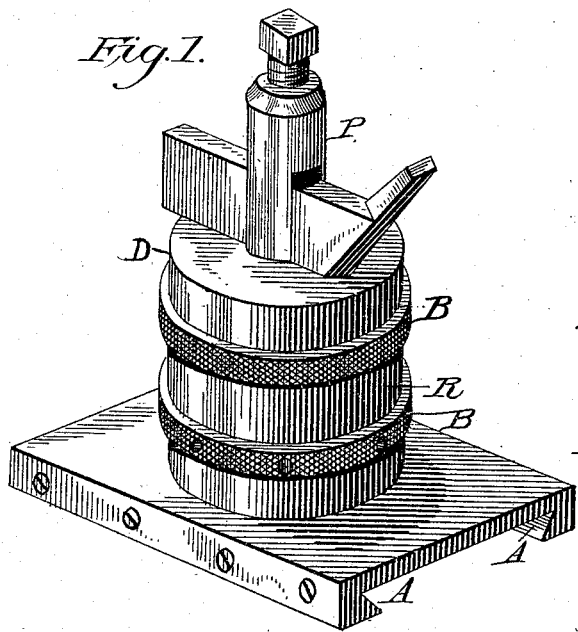
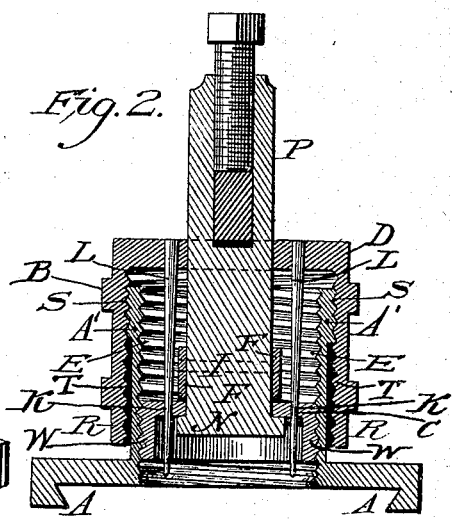
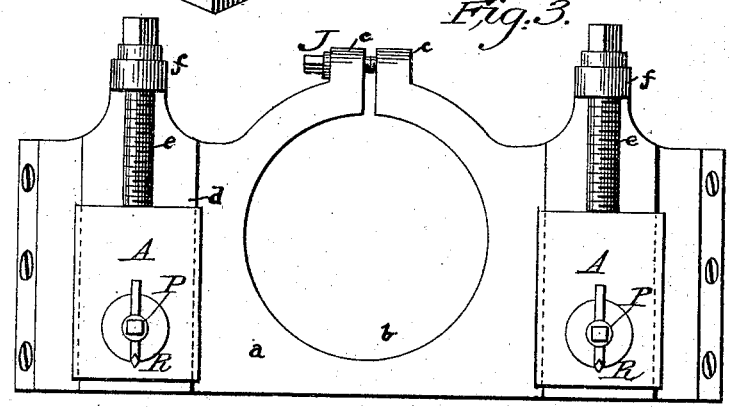
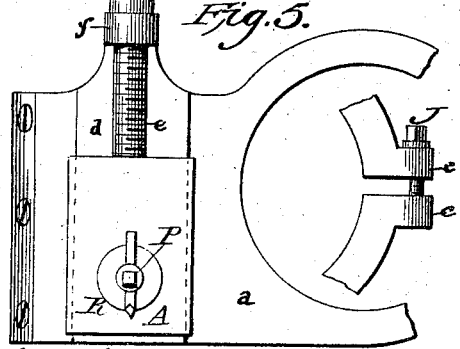
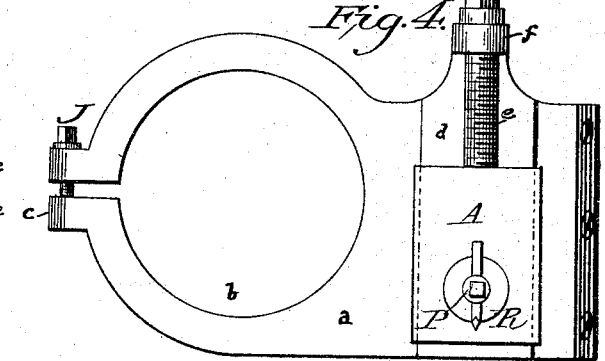
Witnesses.
Hardy Bryan Brauner
William Payne Smith
Inventor:
William Lenoir Ramsey

United States Patent Office.

WILLIAM LENOIR RAMSEY, OF KNOXVILLE, TENNESSEE.

LATHE-TOOL REST.

SPECIFICATION forming part of Letters Patent No. 416,644, dated December 3, 1889.

Application filed September 3, 1888. Serial No. 284,501. (No model.)

*To all whom it may concern:*

Be it known that I, WILLIAM LENOIR RAMSEY, a citizen of the United States, residing at Knoxville, in the county of Knox and State of Tennessee, have invented a new and useful Improvement in Lathe-Rests, of which the following is a specification.

My invention relates to an improved means of adjusting the height of tools to the work to be done in the lathe and maintaining at any height or position of the tool in use a straight and even bearing of the tool on the rest and a proper bearing of the tool-post screw on the tool, and also giving large scope of adjustment, and these are the purposes of the invention. I attain these objects by the mechanism illustrated in the accompanying drawings, in which—

Figure 1 is a perspective view of the rest complete and carrying a tool. Fig. 2 is a vertical sectional view through the center of the rest. Figs. 3, 4, and 5 represent attachments that may be put on or removed from the rest at pleasure or as convenience of work may require.

Similar letters refer to similar parts throughout the several views.

Fig. 1 is a perspective view, in which A represents the base-piece, the bottom of which is the usual attachment to the carriage of the lathe—to wit, by miter-and-gib slide-joint. The cylindrical part A' of the base-piece is inside the rest-piece R. R is the rest-piece or piece on which the tool rests, and through the center of which the tool-post P passes, fitting nicely, but adapted to be turned about freely with the hand. B B are milled bosses on the rest-piece to take hold of with the hand to revolve the piece. Holes (as shown in the figure) or slots may be made in bosses to use a spanner-wrench, if necessary. D represents a plain surface turned of a size suitable to receive the movable attachments, Figs. 3, 4, and 5. The first boss forms a shoulder for the attachments to rest upon.

P is the tool-post, fitted with the usual screw in the top to tighten upon the tool.

In the sectional view, Fig. 2, A is the base-piece, its bottom being the usual attachment to the carriage of the lathe, by miter-and-gib slide-joint, and the upper part A' being made cylindrical and having a screw E cut throughout its entire internal cylindrical surface, and also a screw S is cut on its external surface to any desired distance from the top. Below the screw S the cylinder is turned smaller, presenting on the outside a smooth surface when uncovered by the rest-piece. R is the rest-piece, made cylindrical throughout and having the top end closed, on which the tool rests, and throughout its entire internal surface a screw T is cut corresponding to and fitting the outside screw S on the base-piece A. The carrier C, carrying the tool-post, is also made cylindrical and of any convenient length, having on its entire outside cylindrical surface a screw W cut, which corresponds to and fits the inside screw E in the base-piece A. The carrier has a hole in its center, by which the tool-post is attached to it, which may be done in various ways, each the equivalent of the other. In the drawings it is by an enlargement N on the lower end of the tool-post, forming a collar below the carrier C, and having a collar F on top of the carrier, fastened by a pin I, all allowing the tool-post to be revolved freely about.

The tool-post may be attached to the carrier by turning down the lower end, forming a shoulder above, with a screw and nuts below the carrier, or it may be attached by a set-bolt screwed into the bottom of the tool-post; but any of the means used must allow of the tool-post being freely revolved about.

The tool-post may be attached to the carrier by turning a recess in the lower end of it and inserting it eccentrically in the carrier and bringing it through a slot to the center of the carrier.

The threads in all these parts hereinbefore described and lettered are to be of the same pitch or number to the inch.

L L are lugs attached to the top of the rest-piece R and projecting downward into receptacles K K in the carrier C. These lugs may be made in any convenient way—by studs, as shown in the drawings, attached to the upper inside surface of the rest-piece and extending into receptacles formed in the carrier, or by projections on either or both the rest-piece and the carrier engaging corresponding pieces or receptacles in the other, so that the carrier is turned about with the rest-piece, but allowing the rest-piece and carrier to be brought nearer to each other or moved farther from each other. The object of these lugs is to cause the carrier to revolve with the rest-piece, but not hinder the two parts being brought nearer together or moved farther apart.

To use this improved lathe-rest it is only necessary to select the tool proper to do the cutting in the lathe, put it in place in the tool-post, bring it to the right height by revolving the rest-piece, and securely tighten the tool-post screw, which at the same time securely tightens all parts of the rest together.

The figures 3, 4, and 5 represent movable parts, which may be put on the rest at D when convenience of work may require.

The attachments consist of a bed-plate $a$, having a contracting opening $b$, provided by the screw-threaded lugs $c$, through which passes a tightening-screw J. When the attachment is made as shown in Fig. 3, there is provision for two tool-posts; but when made as in Figs. 4 and 5 there is provision for one only. To this end the attachments are provided with dovetails or undercut slideways $d$, on which are fitted the slides, that are provided with tool-posts, as shown. The tools carried by these tool-posts are adjusted to their work by means of adjusting-screws $e$, that engage said slides and pass through screw-threaded lugs $f$.

The attachments are used as follows: Take one—say that represented in Fig. 5—and place its opening over the plain portion D of the rest-piece R, Fig. 1, and then tighten the screw J, after having adjusted the attachment to the right height. Move the tool carried by the slide to proper position by means of screw $e$. Now, suppose a shaft is to be turned in the lathe. The tool in the rest proper may be set to take a first and rough cut, and the tool of the attachment adjusted, as described, to take a smaller or finishing cut, and by this means saving time or doing work faster. The devices shown in Figs. 3 and 4 may be used likewise when convenient or desirable.

Having thus described my invention, what I claim as new, and desire to secure by Letters Patent, is—

1. The combination of the base-piece A, having a cylindrical standard provided with an internal screw-thread E from end to end and an external screw-thread S for a suitable distance from its top, the internally-threaded cylindrical rest-piece R, fitting on the outside of the cylindrical part of the base-piece, and the tool-post carrier fitting the interior of the same, as explained.

2. The combination of the base-piece A, having the cylindrical standard threaded internally and externally, the tool-post carrier C, and rest-piece R, fitting the cylindrical base-piece on the inside and outside, respectively, and connecting-lugs L, permitting said tool-post carrier and rest-piece to be set at any distance asunder and connecting them, so as to cause their simultaneous and equal vertical adjustment on the base-piece, as explained.

3. The combination of the internally and externally threaded base-piece A, the externally-threaded tool-post carrier C, and internally-threaded rest-piece R, fitting the inside and outside of the base-piece, respectively, and having a common vertical adjustment, and the tool-post P, swiveled in the carrier C and extending through an opening in the top of the rest-piece, as explained.

4. The combination of the internally-threaded base-piece A, the circumferentially-threaded carrier C, fitting therein, the tool-post P, swiveled in said carrier and having a set-screw for engaging the tool, and an independent rest-piece upon which the tool rests, substantially as set forth.

5. The rest-piece R, constructed, as described, with an external collar, in combination with the movable clamp attachment fitting the exterior of the said rest-piece, as explained.

WILLIAM LENOIR RAMSEY.

Attest:
HARDY BRYAN BRANNER,
WILLIAM PAYNE SMITH.